United States Patent
Takenouchi (10) Patent No.: US 9,807,611 B2
(45) Date of Patent: Oct. 31, 2017

(54) ELECTRONIC DEVICE AND VOICEPRINT AUTHENTICATION METHOD

(71) Applicant: KYOCERA CORPORATION, Kyoto (JP)

(72) Inventor: Hayato Takenouchi, Kizugawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/134,187

(22) Filed: Apr. 20, 2016

(65) Prior Publication Data
US 2016/0316366 A1   Oct. 27, 2016

(30) Foreign Application Priority Data

Apr. 23, 2015   (JP) ................................. 2015-088204

(51) Int. Cl.
*H04M 1/66* (2006.01)
*H04W 12/06* (2009.01)
*G06F 21/32* (2013.01)
*G10L 17/22* (2013.01)
*H04L 29/06* (2006.01)
*G10L 17/24* (2013.01)

(52) U.S. Cl.
CPC ............ *H04W 12/06* (2013.01); *G06F 21/32* (2013.01); *G10L 17/22* (2013.01); *H04L 63/0861* (2013.01); *G10L 17/24* (2013.01)

(58) Field of Classification Search
CPC ......... G06F 21/32; G10L 17/22; G10L 17/24; G10L 17/04; G10L 17/08; H04L 63/0861; H04W 12/06

USPC ......................................................... 455/411
See application file for complete search history.

(56) References Cited

U.S. PATENT DOCUMENTS

| | | | | |
|---|---|---|---|---|
| 8,543,834 B1* | 9/2013 | Barra | ...................... | G06F 21/32 713/182 |
| 2012/0245941 A1* | 9/2012 | Cheyer | ................... | G06F 21/32 704/246 |
| 2014/0366128 A1* | 12/2014 | Venkateswaran | ....... | H04L 63/08 726/19 |
| 2015/0142438 A1* | 5/2015 | Dai | ........................ | G10L 17/22 704/246 |

(Continued)

FOREIGN PATENT DOCUMENTS

JP   2006-093934 A   4/2006

*Primary Examiner* — Timothy Pham
(74) *Attorney, Agent, or Firm* — Duane Morris LLP (57) ABSTRACT

An electronic device uses a voiceprint for user authentication, and includes a storage unit, a voice input unit, and at least one processor. The storage unit registers a first voiceprint based on first voice corresponding to a first character string and a second voiceprint based on second voice corresponding to a second character string longer than the first character string. The at least one processor generates a third voiceprint from third voice input to the voice input unit after registration of the voiceprint in the storage unit, and makes a first comparison between the first voiceprint and the third voiceprint as first user authentication. The at least one processor generates a fourth voiceprint from fourth voice input to the voice input unit after the third voice, and makes a second comparison between the second voiceprint and the fourth voiceprint, when the first user authentication has failed.

6 Claims, 7 Drawing Sheets

(56) References Cited

U.S. PATENT DOCUMENTS

2015/0340025 A1* 11/2015 Shima .................... G06F 21/32
704/246

* cited by examiner

ELECTRONIC DEVICE AND VOICEPRINT AUTHENTICATION METHOD

CROSS-REFERENCE TO RELATED APPLICATION

The present application claims priority under 35 U.S.C. §119 to Japanese Patent Application No. 2015-088204 filed on Apr. 23, 2015, entitled "Electronic Device and Voiceprint Authentication Method." The content of which is incorporated by reference herein in its entirety.

FIELD

The present disclosure relates to an electronic device and a voiceprint authentication method.

BACKGROUND

An electronic device which uses a voiceprint for user authentication has been known. For example, a portable telephone terminal which uses a voiceprint for user authentication has been known.

SUMMARY

An electronic device according to one embodiment is an electronic device which uses a voiceprint for user authentication. The electronic device includes a storage unit, a voice input unit, and at least one processor. The storage unit is configured to register a first voiceprint based on first voice corresponding to a first character string and a second voiceprint based on second voice corresponding to a second character string longer than the first character string. The at least one processor is configured to generate a third voiceprint from third voice input to the voice input unit after registration of the first voiceprint and the second voiceprint in the storage unit, to make a first comparison between the first voiceprint and the third voiceprint, and to determine whether or not first user authentication has been successful based on a result of the first comparison. The at least one processor is configured to generate a fourth voiceprint from fourth voice input to the voice input unit after the third voice, to make a second comparison between the second voiceprint and the fourth voiceprint, and to determine whether or not second user authentication has been successful based on a result of the second comparison, when the first user authentication has failed.

In the present disclosure, a "voiceprint" refers to a result obtained by conducting frequency analysis, for each uttered voice, of speech waveform data produced at the time when a user reads out a prescribed character string and arranging resultant data in the order of utterance (chronological order). The "voiceprint" in the present disclosure includes both of a characteristic of utterance by a user and a characteristic of a prescribed character string. The "voiceprint" may include a pattern of characteristics extracted from human's voice.

A voiceprint authentication method according to another embodiment includes the steps of registering a voiceprint and performing user authentication after the step of registering a voiceprint. The step of registering a voiceprint includes the steps of generating a first voiceprint from first voice corresponding to a first character string and registering the first voiceprint. The step of registering a voiceprint further includes the steps of generating a second voiceprint from second voice corresponding to a second character string longer than the first character string and registering the second voiceprint. The step of performing user authentication includes the steps of generating a third voiceprint from third voice, making a first comparison between the first voiceprint and the third voiceprint, and determining whether or not first user authentication has been successful based on a result of the first comparison. The step of performing authentication further includes the steps of generating a fourth voiceprint from fourth voice uttered after the third voice, making a second comparison between the second voiceprint and the fourth voiceprint, and determining whether or not second user authentication has been successful based on a result of the second comparison, when the first user authentication has failed.

DETAILED DESCRIPTION

An embodiment of the present disclosure will be described hereinafter in detail with reference to the drawings. The same or corresponding elements in the drawings have the same reference characters allotted and description thereof will not be repeated.

Figure 1:
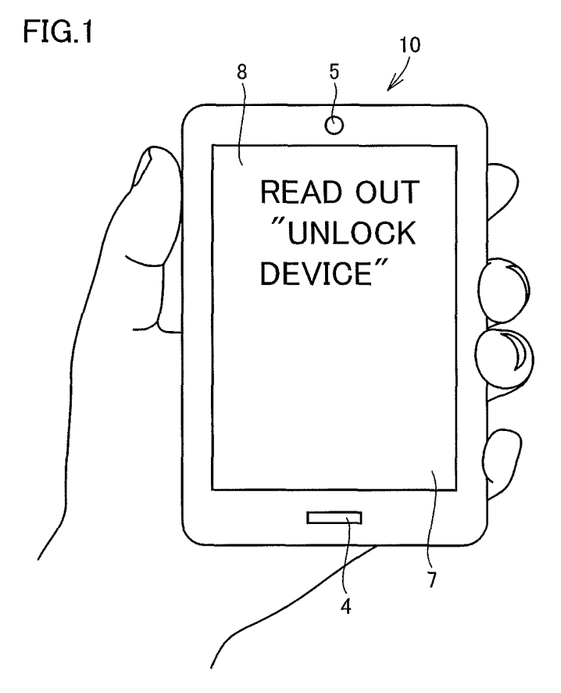
FIG. 1 shows an appearance of a smartphone representing an electronic device according to an embodiment.

FIG. 1 shows an appearance of a smartphone 10 representing an electronic device according to an embodiment. Referring to FIG. 1, smartphone 10 has a speaker 5 in an upper portion in a longitudinal direction of a main body portion, a microphone 4 in a lower portion in the longitudinal direction of the main body portion, an operation input unit 8 in a central portion, and a display 7. In FIG. 1, input through operation input unit 8 is prohibited (locked), and a message "read out 'UNLOCK DEVICE'" displayed at the time of voiceprint authentication is displayed on display 7. A user reads out "UNLOCK DEVICE" in response to such a representation.

Even when input through operation input unit 8 is prohibited as in FIG. 1, by inputting voice to microphone 4, use of a prescribed function of smartphone 10 corresponding to that voice may be permitted. For example, when smartphone 10 has a camera, photographing by the camera may be permitted when a user utters "camera" to microphone 4.

Figure 2:
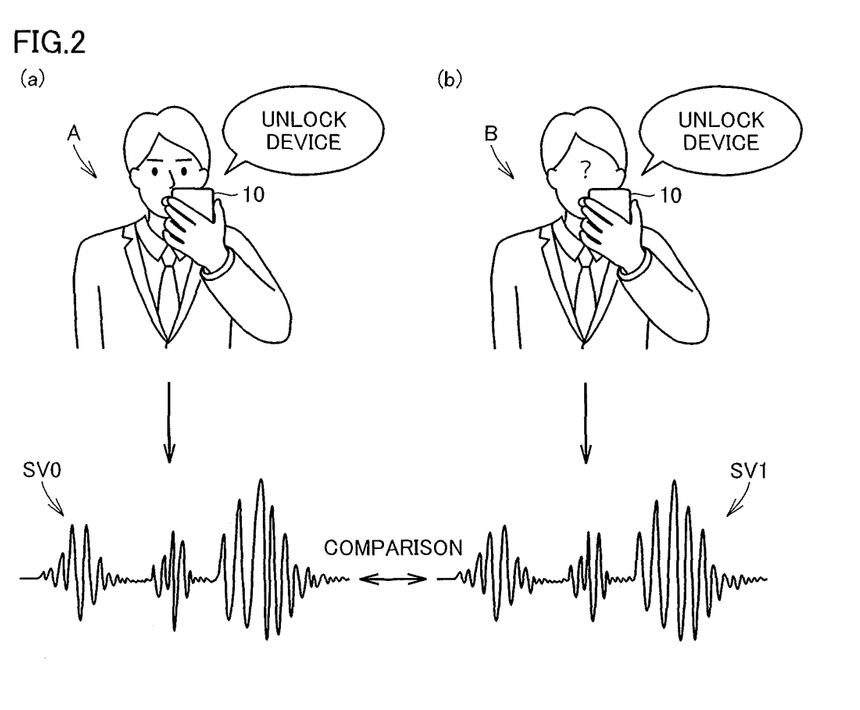
FIG. 2 is a diagram showing a user reading out a character string.

FIG. 2 is a diagram showing a user reading out a character string. There are two types of scenes in which a user reads out a character string. FIG. 2(a) is a diagram showing a scene in which a user A reads out a character string and registers a voiceprint of the user himself/herself in advance (hereinafter also referred to as "voiceprint registration"). The voiceprint is registered prior to voiceprint authentication. FIG. 2(b) is a diagram showing a scene in which a user B reads out a character string and inputs his/her voice to smartphone 10 at the time of voiceprint authentication. Occasions for voiceprint authentication include, for example, activation of smartphone 10 or recovery from a sleep state. Referring to FIG. 2(a), a voiceprint SV0 is based on voice corresponding to "UNLOCK DEVICE" input by user A to microphone 4. Voiceprint SV0 is registered in a storage unit in smartphone 10. Referring to FIG. 2(b), a voiceprint SV1 is based on voice corresponding to "UNLOCK DEVICE" input by user B to microphone 4. Voiceprint SV1 and voiceprint SV0 registered in advance are compared with each other and whether or not user authentication has been successful is determined. When authentication has been successful, lock is released and input through operation input unit 8 is permitted.

Figure 3:
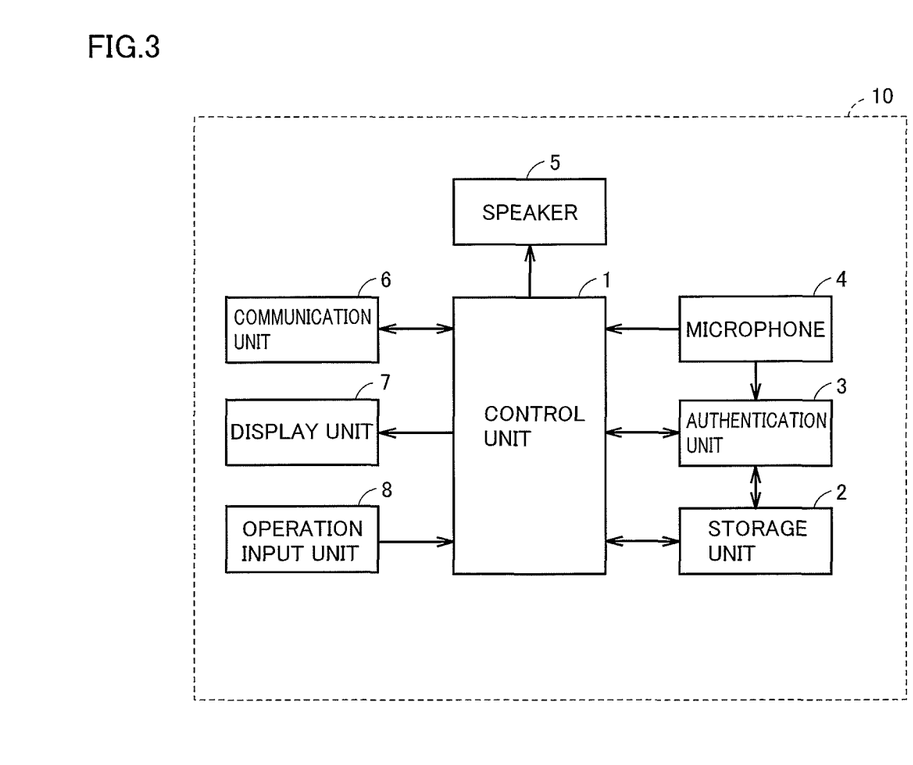
FIG. 3 is a functional block diagram for illustrating a function of the smartphone in FIG. 1.

FIG. 3 is a functional block diagram for illustrating a function of smartphone 10 in FIG. 1. Referring to FIG. 3, smartphone 10 includes a control unit 1, a storage unit 2, an authentication unit 3, microphone 4, speaker 5, a communication unit 6, display 7, and operation input unit 8.

Control unit 1 can include a processor such as a central processing unit (CPU) and a static random access memory (SRAM) or a dynamic random access memory (DRAM) as a storage element, which are not shown, and can control smartphone 10 in a centralized manner.

Storage unit 2 can save an operating system (OS) read and executed by control unit 1, programs for various applications (for example, a program for voiceprint authentication), and various types of data used by the programs (for example, a character string and a voiceprint necessary for voiceprint authentication). Storage unit 2 may include, for example, a read only memory (ROM), an electrically erasable programmable ROM (EEPROM), and a flash memory which are non-volatile semiconductor memories, or a hard disk drive representing a storage device.

Communication unit 6 can include an antenna switch, a duplexer, a power amplifier, a low-noise amplifier, and a band pass filer. Communication unit 6 can communicate over a communication network of a telecommunication carrier under long term evolution (LTE) or code division multiple access (CDMA) specifications. Communication unit 6 can process a signal received by the antenna and transmit the signal to control unit 1. Control unit 1 can have a signal transmitted to communication unit 6 and have a signal subjected to signal processing in communication unit 6 transmitted from the antenna. Communication unit 6 includes a wireless LAN (Local Area Network) circuit and a wireless LAN antenna which are not shown, and can communicate with a WiFi® adapted device such as a WiFi access point, based on WiFi.

Display unit 7 can provide a representation based on signals received from control unit 1. Display unit 7 may be implemented, for example, by a liquid crystal display, a plasma display, or an organic EL (Electro Luminescence) display.

Operation input unit 8 can accept an operation input from a user and transmit a signal based on the operation input to control unit 1. Operation input unit 8 may be implemented, for example, by a button or a touch panel.

Authentication unit 3 can conduct frequency analysis on an audio signal received from microphone 4, for example, with FFT (Fast Fourier Transform), and generate a voiceprint. Authentication unit 3 can compare the voiceprint with a voiceprint registered in storage unit 2, and determine whether or not authentication has been successful based on a result of comparison. Authentication unit 3 is implemented by execution of a program for voiceprint authentication by control unit 1.

Since voiceprint authentication can be performed simply by orally reading out a character string, it is more convenient than an authentication method in which a password is manually input through a character input device such as a keyboard. Since comparison of a voiceprint is made in voiceprint authentication, even though a character string necessary for voiceprint authentication is revealed to others, that fact does not immediately lead to successful impersonation by others.

When others who have known a character string necessary for voiceprint authentication imitate voice of an authorized person, identity of a person may erroneously be determined in voiceprint authentication and others may successfully impersonate the authorized person. In order to improve security in voiceprint authentication, a long character string difficult to be reproduced by others may be used. It takes time to read out a long character string. Voice produced at the time when a long character string is read out often includes many characteristics and an amount of information of a voiceprint produced therefrom is large, which leads to a long time for comparison between voiceprints. When a long character string is always used, voiceprint authentication is time-consuming and convenience normally achieved by voiceprint authentication is sacrificed.

In an embodiment, first user authentication using a voiceprint based on voice corresponding to a relatively short first character string is performed, and when first user authentication has failed, second user authentication using a voiceprint based on voice corresponding to a second character string longer than the first character string is performed. An occasion for voiceprint authentication using a long character string which is time-consuming can be limited, and convenience and security of voiceprint authentication can both be achieved.

A flow of processing in voiceprint authentication performed in smartphone 10 representing an electronic device according to an embodiment will be described below with reference to FIGS. 3, 4, and 5. In voiceprint authentication described below, a voiceprint is converted into numeric values representing a voiceprint score, for example, in a standardized range from 0 to 100, and a reciprocal of an absolute value of a difference in voiceprint score between two voiceprints is calculated as a similarity between the two voiceprints.

Figure 4:
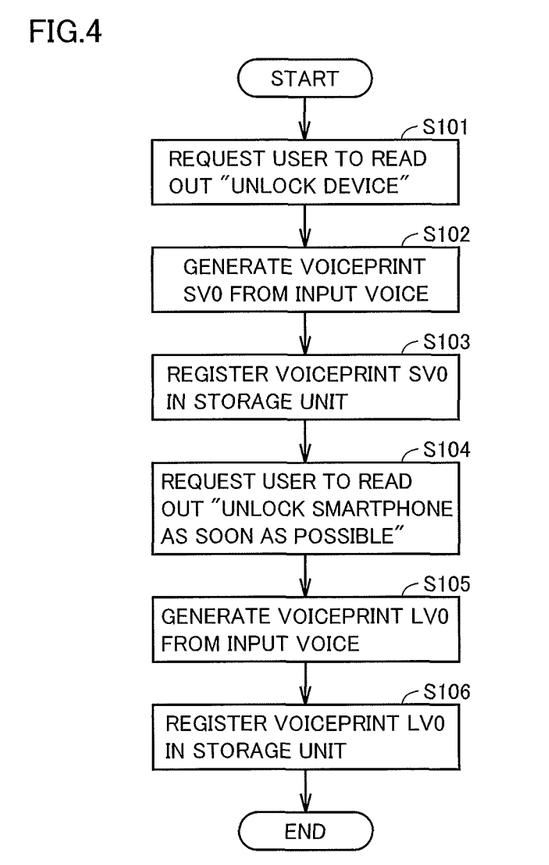
FIG. 4 is a flowchart for illustrating a flow of processing in character string voiceprint registration.

FIG. 4 is a flowchart for illustrating a flow of processing in voiceprint registration. Referring to FIGS. 3 and 4, in step S101, authentication unit 3 can have display 7 show a message instructing user A to read out "UNLOCK DEVICE" representing a first character string, and the process can proceed to step S102. Authentication unit 3 can generate a voiceprint SV0 from voice input by user A to microphone 4 in step S102, and the process can proceed to step S103. Authentication unit 3 can have voiceprint SV0 registered in storage unit 2 in step S103, and the process can proceed to step S104. Authentication unit 3 can have display 7 show a message instructing user A to read out "UNLOCK SMARTPHONE AS SOON AS POSSIBLE" representing a second character string in step S104, and the process can proceed to step S105. Authentication unit 3 can generate a voiceprint LV0 from voice input by user A to microphone 4 in step S105, and the process can proceed to step S106.

Authentication unit 3 can have voiceprint LV0 registered in storage unit 2 in step S106, and the process for voiceprint registration can end.

Figure 5:
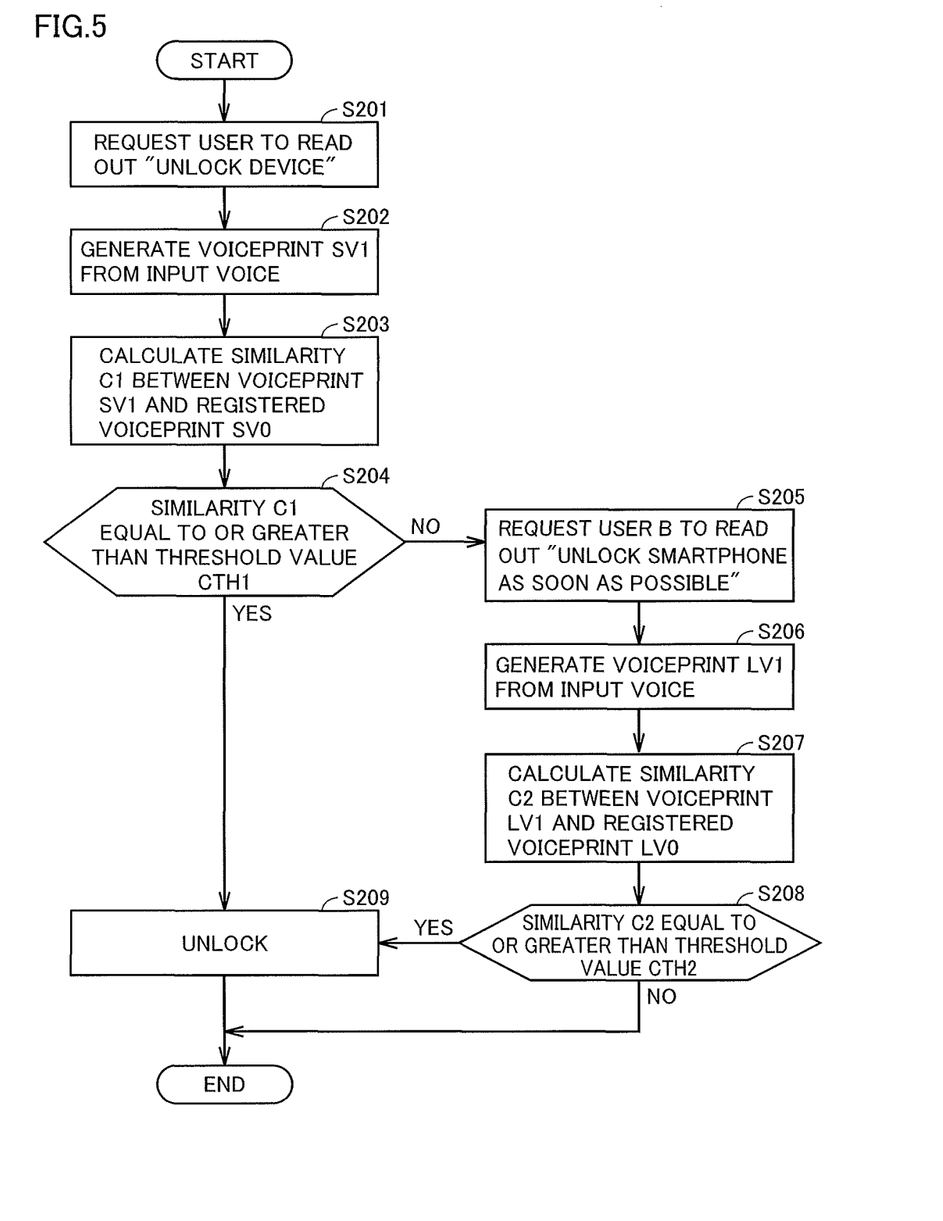
FIG. 5 is a flowchart for illustrating a flow of processing in voiceprint authentication.

FIG. 5 is a flowchart for illustrating a flow of processing in voiceprint authentication. In voiceprint authentication, whether or not user A who has registered voiceprints and user B of which voiceprint should be authenticated are the same person is determined. User A and user B may or may not be the same person. At the time point of start of voiceprint authentication, operation input unit 8 in FIG. 3 has been locked and input onto operation input unit 8 is prohibited. Referring to FIGS. 3 and 5, authentication unit 3 can request user B to read out "UNLOCK DEVICE" representing the first character string in step S201, and the process can proceed to step S202. Authentication unit 3 can generate a voiceprint SV1 from voice input by user B to microphone 4 in step S202, and the process can proceed to step S203. Authentication unit 3 can compare voiceprint SV1 and voiceprint SV0 registered in storage unit 2 with each other in step S203 and calculate a similarity C1 between them, and the process can proceed to step S204. Authentication unit 3 can determine in step S204 whether or not similarity C1 is equal to or greater than a prescribed threshold value CTH1.

When similarity C1 is equal to or greater than threshold value CTH1 in step S204 (YES in S204), authentication unit 3 can determine that first authentication has been successful. The process can proceed to step S209, and lock can be released and thereafter the process can end. When similarity C1 is smaller than prescribed threshold value CTH1 in step S204 (NO in S204), authentication unit 3 can determine that first authentication has failed and the process can proceed to step S205. Failure in authentication can include a case that user A and user B are not the same person or a case that a character string other than "UNLOCK DEVICE" has been read although user A and user B are the same person.

Authentication unit 3 can have display 7 show a message instructing user B to read out "UNLOCK SMARTPHONE AS SOON AS POSSIBLE" representing the second character string in step S205, and the process can proceed to step S206. Authentication unit 3 can generate a voiceprint LV1 from voice input by user B to microphone 4 in step S206, and the process can proceed to step S207. Authentication unit 3 can compare voiceprint LV1 and voiceprint LV0 registered in storage unit 2 with each other in step S207 and calculate a similarity C2 between them, and the process can proceed to step S208. Authentication unit 3 can determine in step S208 whether or not similarity C2 is equal to or greater than a prescribed threshold value CTH2. Threshold value CTH2 is smaller than threshold value CTH1. A reason why threshold value CTH2 is smaller than threshold value CTH1 will be described later.

When similarity C2 is equal to or greater than threshold value CTH2 in step S208 (YES in S208), authentication unit 3 can determine that second authentication has been successful. The process can proceed to step S209, operation input unit 8 can be unlocked, and thereafter the process can end. When similarity C2 is smaller than threshold value CTH2 in step S208 (NO in S208), authentication unit 3 can determine that second authentication has failed and the process can end. Failure in authentication is similar to the case that "UNLOCK DEVICE" has been set as a character string necessary for authentication.

Figure 9:
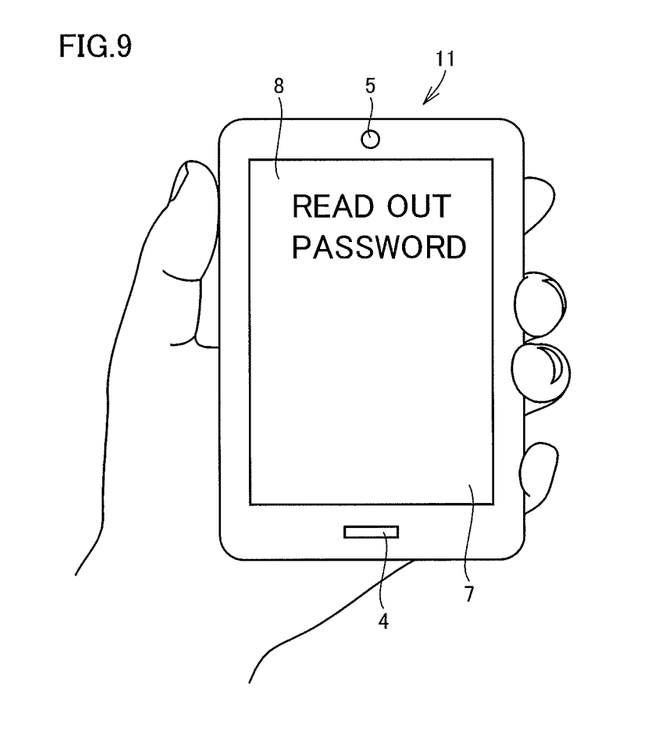
FIG. 9 shows an appearance of a smartphone representing an electronic device according to another embodiment.

When similarity C2 is smaller than threshold value CTH2 in step S208 (NO in S208), authentication unit 3 may have display 7 indicate failure in authentication. The authentication unit may request a user to read out a character string longer than "UNLOCK SMARTPHONE AS SOON AS POSSIBLE." As shown in FIG. 9, the authentication unit may request a user to read out a password without displaying a character string.

Figure 6:
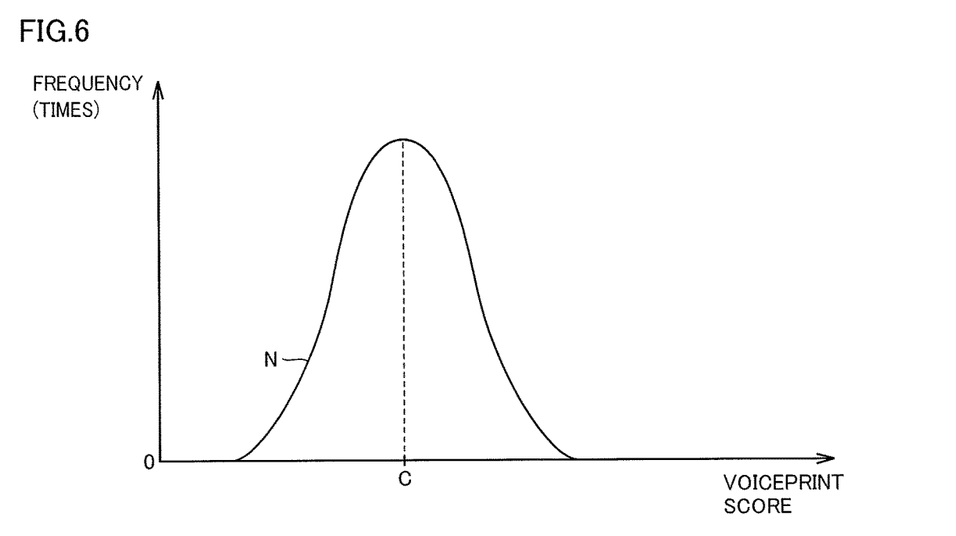
FIG. 6 is a diagram modeling relation between a voiceprint score and a frequency at which a voiceprint corresponding to the voiceprint score is reproduced.

The reason why threshold value CTH2 is smaller than threshold value CTH1 will be described with reference to FIGS. 6 to 8. FIG. 6 is a diagram modeling relation between a voiceprint score and a frequency at which a voiceprint corresponding to the voiceprint score is reproduced. Referring to FIG. 6, relation between a voiceprint score in a case that a person reads out a prescribed character string and a frequency of reproduction of a voiceprint corresponding to the voiceprint score (hereinafter also referred to as "voiceprint distribution") can be modeled as being in accordance with a normal distribution represented by a curve N. In voiceprint authentication, a voiceprint score corresponding to a voiceprint at the time of voiceprint registration is defined as a voiceprint score C located in the center of a voiceprint distribution.

Figure 7:
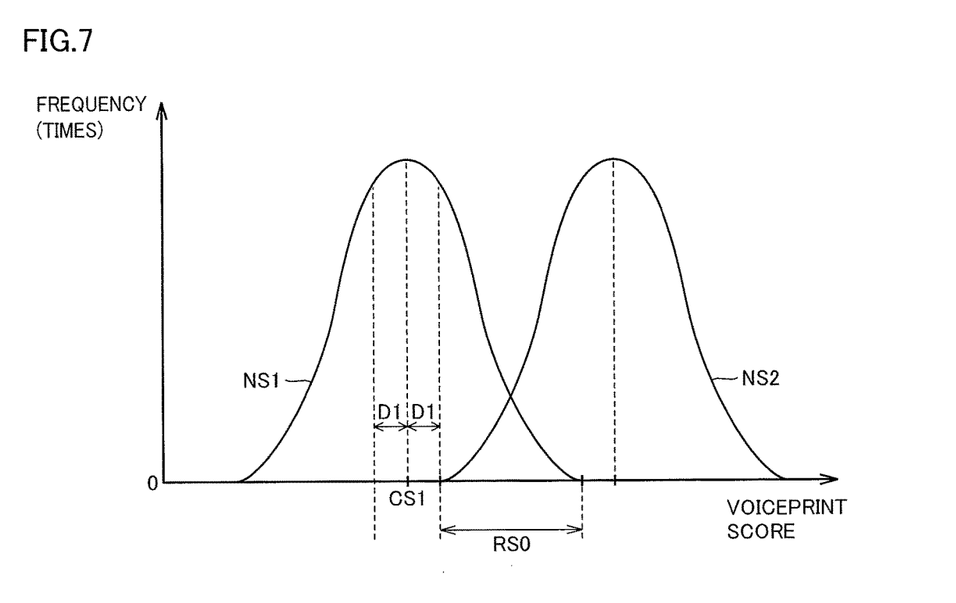
FIG. 7 is a diagram showing distributions of voiceprint scores when two persons read out a character string "UNLOCK DEVICE."

FIG. 7 is a diagram showing distributions of voiceprint scores when user A and user B read out "UNLOCK DEVICE" when user A and user B are not the same person. In FIG. 7, a curve NS1 represents a voiceprint distribution when user A reads out the character string and a curve NS2 represents a voiceprint distribution when user B reads out the character string. A voiceprint score CS1 is a voiceprint score corresponding to voiceprint SV0 registered as user A reads out "UNLOCK DEVICE" at the time of registration of a voiceprint. Referring to FIG. 7, the voiceprint distributions of both users overlap with each other in a range RS0. Since a voiceprint corresponding to the voiceprint score included in the range where voiceprint distributions overlap with each other is a voiceprint which can be reproduced also by user B, range RS0 can be a range in which user B may incorrectly be determined as user A. In order to determine that it is user A to be authorized, a voiceprint score S1 of a voiceprint SV resulting from utterance from a person to be authorized should be a voiceprint score out of range RS0. With a difference between voiceprint score CS1 and a boundary value on a side of voiceprint score CS1 in range RS0 being defined as a difference D1, when an absolute value of the difference between voiceprint score S1 and voiceprint score CS1 is greater than difference D1, voiceprint score S1 may be included in range RS0. In order to determine that it is user A to be authorized, the absolute value should be not greater than difference D1. Since similarity C1 between voiceprint SV and voiceprint SV0 is a reciprocal of the absolute value, similarity C1 should be equal to or greater than 1/D1. Threshold value CTH1 for similarity C1 for determining that it is user A to be authorized can be set to 1/D1.

Figure 8:
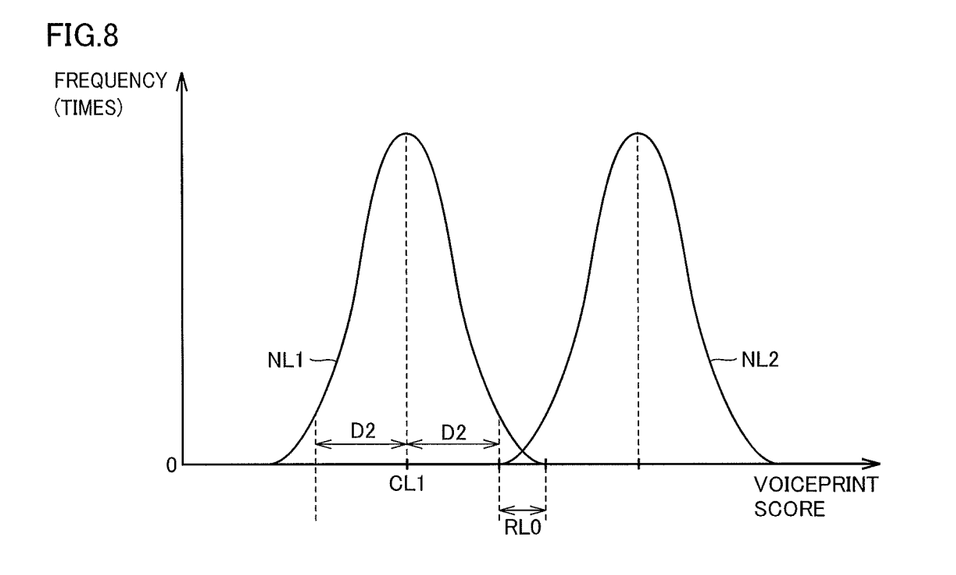
FIG. 8 is a diagram showing distributions of voiceprint scores when two persons read out a character string "UNLOCK SMARTPHONE AS SOON AS POSSIBLE."

FIG. 8 is a diagram showing distributions of voiceprint scores when user A and user B read out "UNLOCK SMARTPHONE AS SOON AS POSSIBLE" when user A and user B are not the same person. In FIG. 8, a curve NL1 represents a voiceprint distribution when user A reads out the character string and a curve NL2 represents a voiceprint distribution when user B reads out the character string. A voiceprint score CL1 is a voiceprint score corresponding to voiceprint LV0 registered as user A reads out "UNLOCK SMARTPHONE AS SOON AS POSSIBLE" at the time of registration of the voiceprint. Referring to FIG. 8, the voiceprint distributions of both users overlap with each other in a range RL0. Since a voiceprint corresponding to the voiceprint score included in the range where voiceprint distributions overlap with each other is a voiceprint which can be reproduced also by user B, range RL0 can be a range in which user B may incorrectly be determined as user A. In order to determine that it is user A to be authorized, a voiceprint score L1 of a voiceprint LV resulting from utterance from a person to be authorized should be a voiceprint score out of range RL0. With a difference between voiceprint score CL1 and a boundary value on a side of voiceprint score CL1 in range RL0 being defined as a difference D2, when an absolute value of the difference between voiceprint score L1 and voiceprint score CL1 is greater than difference D2, voiceprint score L1 may be included in range RL0. In order to determine that it is user A to be authorized, the absolute value should be not greater than difference D2. Since similarity C2 between voiceprint LV and voiceprint LV0 is a reciprocal of the absolute value, similarity C2 should be not less than 1/D2. Threshold value CTH2 for similarity C2 for determining that it is user A to be authorized can be set to 1/D2.

As a character string used for voiceprint authentication is longer, many phonetic characteristics of an utterer are included in a voiceprint generated at the time when the character string is read out. Variation in voiceprint generated at the time when a person reads out the character string is thus less, which means that a standard deviation is small in voiceprint distribution.

A curve NS1 representing a voiceprint distribution at the time when user A reads out "UNLOCK DEVICE" and curve NL1 representing a voiceprint distribution at the time when the user reads out "UNLOCK SMARTPHONE AS SOON AS POSSIBLE" are compared with each other with reference to FIGS. 7 and 8. The voiceprint distribution represented by curve NL1 is unevenly present around voiceprint score CL1 in the center and the standard deviation is small. This is also applicable to curves NS2 and NL2 representing voiceprint distributions at the time when user B reads out the two character strings. Range RL0 is thus narrower than range RS0. Since a range in which user B is incorrectly determined as user A is thus narrower, a range of voiceprint scores where a person to be authorized is not incorrectly determined is wider. Since difference D2 is greater than difference D1, threshold value CTH2 can be smaller than threshold value CTH1.

According to the electronic device in an embodiment, only when voiceprints do not match as a result of voiceprint authentication using a short character string which is highly convenient but is low in security, voiceprint authentication using a long character string high in security but low in convenience is performed, and convenience and security in voiceprint authentication can thus both be achieved.

In an embodiment, user authentication is performed by using a short character string in first user authentication, and user authentication is performed by using a long character string in second user authentication. When a short character string is used, a time period required for authentication is short, however, another person may be highly likely to incorrectly be determined as a user to be authorized. Then, in first user authentication, a condition for successful authentication is limited by increasing threshold value CTH1. When a long character string is used, though a time period required for authentication is longer, another person is less likely to incorrectly be determined as a user to be authorized. Therefore, a condition for successful authentication has been relaxed by lowering threshold value CTH2 than threshold value CTH1. Convenience and security in voiceprint authentication are thus further achieved.

In an embodiment, a character string necessary for authentication is shown during voiceprint authentication. As in a smartphone 11 shown in FIG. 9, the character string does not have to be shown during voiceprint authentication. By not showing the character string during voiceprint authentication, the character string will not be known to another person who operates smartphone 11 and security in voiceprint authentication can further be enhanced.

In an embodiment, a message indicating readout of a character string necessary for authentication in voiceprint authentication is displayed. Voiceprint authentication may be performed without displaying a message.

In an embodiment, "UNLOCK DEVICE" is defined as the first character string and "UNLOCK SMARTPHONE AS SOON AS POSSIBLE" is defined as the second character string. A character string necessary for voiceprint authentication is not limited to the two character strings. A character string necessary for voiceprint authentication is preferably a character string in which phonetic characteristics of a user are likely to appear, and any character string is applicable for the first character string and the second character string so long as phonetic characteristics of a user are more likely to appear in the second character string than in the first character string. For example, words used for voice search with a search engine after prescribed user authentication has successfully been performed may be stored, and a character string to be used for voiceprint authentication may be selected from among the words. Voice calls after prescribed user authentication has successfully been performed may be stored, and a character string to be used for voiceprint authentication may be selected from among words used in the calls.

A character string to be used for voiceprint authentication does not have to be saved in the electronic device according to an embodiment. For example, a character string saved in an external server may be used. By saving a character string to be used for voiceprint authentication in an external server, for example, even though a user changes a smartphone representing the electronic device according to an embodiment to another model, a character string saved in the external server can be used in a new smartphone and voiceprint authentication as is conventionally performed can be performed without setting a character string to be used for voiceprint authentication.

In an embodiment, a portable terminal has been described as the electronic device according to an embodiment. An electronic device to which the present disclosure is applicable is not limited to a portable terminal. Any electronic device which can be enabled by being authorized is applicable. For example, the present disclosure is applicable also to an electronic device which performs authentication at the time of entry into and leaving from facilities.

It should be understood that an embodiment disclosed herein is illustrative and non-restrictive in every respect. The scope of the present disclosure is defined by the terms of the claims rather than the description above and is intended to include any modifications within the scope and meaning equivalent to the terms of the claims.

The invention claimed is:

1. An electronic device which uses a voiceprint for user authentication, comprising:
   a storage unit configured to register a first voiceprint based on a first voice corresponding to a first character string and a second voiceprint based on a second voice corresponding to a second character string longer than the first character string, wherein the first and second voices are provided by a single person;
   a voice input unit; and
   at least one processor configured to generate a third voiceprint from a third voice input to the voice input unit after registration of the first voiceprint and the second voiceprint in the storage unit, to make a first comparison between the first voiceprint and the third voiceprint, and to determine whether a first user authentication has been successful based on a result of the first comparison, the at least one processor being configured to generate a fourth voiceprint from a fourth voice input to the voice input unit after the third voice input, to make a second comparison between the second voiceprint and the fourth voiceprint, and to determine whether a second user authentication has been successful based on a result of the second comparison, when the first user authentication has failed, wherein the third and fourth voice inputs are provided by a single person and the at least one processor is configured:

to calculate a first similarity between the first voiceprint and the third voiceprint in the first comparison, to determine that the first user authentication has been successful when the first similarity is greater than a prescribed first threshold value, and to determine that the first user authentication has failed when the first similarity is smaller than the first threshold value, and to calculate a second similarity between the second voiceprint and the fourth voiceprint in the second comparison, to determine that the second user authentication has been successful when the second similarity is greater than a prescribed second threshold value, and to determine that the second user authentication has failed when the second similarity is smaller than the second threshold value, and the second threshold value is smaller than the first threshold value.

2. The electronic device according to claim 1, further comprising an operation input unit, wherein the at least one processor is configured to permit input of an operation onto the operation input unit when the first user authentication has been successful or when the second user authentication has been successful.

3. The electronic device according to claim 2, further comprising a display, wherein the at least one processor is configured to have the display show a first message indicating readout of the first character string when the first user authentication is performed and to have the display show a second message indicating readout of the second character string when the first user authentication has failed.

4. The electronic device according to claim 3, wherein the first message does not include the first character string, and the second message does not include the second character string.

5. The electronic device according to claim 1, comprising a portable terminal.

6. A voiceprint authentication method performed in an electronic device which uses a voiceprint for user authentication, comprising the steps of:

registering a voiceprint; and performing user authentication after the step of registering a voiceprint, the step of registering a voiceprint including the steps of generating a first voiceprint from a first voice corresponding to a first character string, registering the first voiceprint, generating a second voiceprint from a second voice corresponding to a second character string longer than the first character string, and registering the second voiceprint, wherein the first and second voices are provided by a single person, and the step of performing user authentication including the steps of generating a third voiceprint from a third voice, making a first comparison between the first voiceprint and the third voiceprint, determining whether a first user authentication has been successful based on a result of the first comparison, generating a fourth voiceprint from a fourth voice uttered after the third voice when the first user authentication has failed, wherein the third and fourth voices are provided by a single person, making a second comparison between the second voiceprint and the fourth voiceprint, and determining whether a second user authentication has been successful based on a result of the second comparison, wherein determining whether the first user authentication has been successful comprises calculating a first similarity between the first voiceprint and the third voiceprint in the first comparison, to determine that the first user authentication has been successful when the first similarity is greater than a prescribed first threshold value, and to determine that the first user authentication has failed when the first similarity is smaller than the first threshold value, and determining whether the second user authentication has been successful comprises calculating a second similarity between the second voiceprint and the fourth voiceprint in the second comparison, to determine that the second user authentication has been successful when the second similarity is greater than a prescribed second threshold value, and to determine that the second user authentication has failed when the second similarity is smaller than the second threshold value, and wherein the second threshold value is smaller than the first threshold value.

\* \* \* \* \*